United States Patent [19]

Winter

[11] Patent Number: 5,188,203
[45] Date of Patent: Feb. 23, 1993

[54] WEIGHT REDUCED BRAKE ROTOR

[75] Inventor: Klaus Winter, Troy, Mich.

[73] Assignee: ITT Corporation, New York, N.Y.

[21] Appl. No.: 588,229

[22] Filed: Sep. 26, 1990

[51] Int. Cl.$^5$ ................. F16D 65/12; F16D 65/847
[52] U.S. Cl. ..................... 188/218 XL; 188/71.6; 188/264 A; 188/264 AA
[58] Field of Search ........ 188/218 XL, 71.6, 264 AA, 188/264 A, 218 A, 218 R, 58, 59; 192/113 R, 107, 70.12, 113 A; 301/6 CS, 6 WB

[56] References Cited

U.S. PATENT DOCUMENTS

| | | |
|---|---|---|
| 2,464,754 | 3/1949 | Tack . |
| 2,745,518 | 5/1956 | Bachman ................. 188/264 A X |
| 3,623,577 | 11/1971 | Scharlack ..................... 188/71.6 |
| 3,623,579 | 11/1971 | Hendrickson et al. ... 188/264 AA X |
| 3,730,304 | 5/1973 | Buyze ..................... 188/71.6 X |
| 3,773,153 | 11/1973 | Smirl ................. 188/264 AA X |
| 3,899,054 | 8/1975 | Huntress et al. ............ 188/218 XL |
| 4,263,992 | 4/1981 | Moore et al. ........... 188/264 AA X |
| 4,641,731 | 2/1987 | Kawaguchi et al. .... 188/264 AA X |
| 4,745,996 | 5/1988 | Wirth .................. 188/264 A X |
| 4,811,822 | 3/1989 | Estaque .................. 188/218 XL X |
| 4,865,167 | 9/1989 | Giorgetti et al. ........... 188/218 XL |
| 4,928,798 | 5/1990 | Watson et al. ............... 188/71.6 X |

FOREIGN PATENT DOCUMENTS

| | | |
|---|---|---|
| 0318687 | 6/1989 | European Pat. Off. ...... 188/264 AA |
| 1822754 | 1/1960 | Fed. Rep. of Germany . |
| 1941904 | 3/1966 | Fed. Rep. of Germany . |
| 2728335 | 1/1978 | Fed. Rep. of Germany . |
| 2219770 | 7/1982 | Fed. Rep. of Germany . |
| 3115740 | 11/1982 | Fed. Rep. of Germany ..... 188/71.6 |
| 3241549 | 5/1984 | Fed. Rep. of Germany . |
| 3320543 | 12/1984 | Fed. Rep. of Germany ...... 188/218 XL |
| 3603555 | 8/1986 | Fed. Rep. of Germany . |
| 8613662 | 1/1987 | Fed. Rep. of Germany . |
| 3527577 | 2/1987 | Fed. Rep. of Germany ...... 188/264 AA |
| 3740311 | 6/1989 | Fed. Rep. of Germany ..... 188/71.6 |
| 3809530 | 11/1989 | Fed. Rep. of Germany . |
| 289639 | 11/1971 | U.S.S.R. . |
| 1027686 | 4/1962 | United Kingdom . |
| 2076090 | 11/1981 | United Kingdom ........ 188/264 AA |
| 2144186 | 2/1985 | United Kingdom ......... 188/218 XL |

Primary Examiner—Douglas C. Butler
Attorney, Agent, or Firm—Robert P. Seitter; J. Gordon Lewis

[57] ABSTRACT

An improved disc brake rotor is formed with fins extending between the two annular braking members which are elongated tangentially of the rotor axis and disposed in two groups lying at different radial distances from the axis. The tangential orientation of the fins minimizes the amount of material required to form the fins while achieving structural rigidity comparable to other fin arrangements which require substantially more material. The fin arrangements disclosed thus enables a substantial reduction in weight and also achieves efficient cooling air flow patterns for either direction of rotation of the rotor.

16 Claims, 3 Drawing Sheets

WEIGHT REDUCED BRAKE ROTOR

BACKGROUND OF THE INVENTION

The present invention relates to an improved disc brake rotor for automotive applications which achieves the same structural rigidity of rotors of conventional construction with a substantially reduced weight, together with improved cooling characteristics.

While useful in other applications, the present invention is disclosed as being applied to disc brake rotors of the type used in automotive vehicles. The standard brake rotor presently in commercial use for this purpose is constructed as a one piece casting having a hub integral with a first annular plate like braking member. A second annular plate like braking member is integrally joined to the first braking member by a plurality of fins which extend between the two opposed faces of the braking members to support the second braking member in axially spaced coaxial relationship to the first braking member. The fins are spaced from each other to provide for air flow between the opposed faces of the braking members to dissipate the frictional heat generated by application of the vehicle brakes.

In the presently employed standard configuration, the fins which join the two braking members to each other lie in general planes which extend radially from the rotor axis with the radial dimension of the individual fins substantially exceeding the thickness of the fins circumferentially of the rotor axis.

The number, shape and size of the fins employed to join the two braking members to each other must be such as to provide adequate structural strength to transmit braking forces applied to the rib supported braking member to the hub supported braking member while at the same time leaving enough open space between the ribs to accommodate sufficient air flow between the two members to provide adequate cooling. The industry standard radial fin brake rotor has been used for many years, and its design details and techniques for manufacturing the rotor have been exhaustively refined. While many alternative fin arrangements have been proposed, few, if any, have enjoyed any substantial commercial success, typically because any improved performance achieved by alternative designs has been outweighed by increased manufacturing costs.

The present invention is directed to a brake rotor having fins dimensioned and configured in a manner such that less than half of the material required to form the fins of a standard radial fin rotor of comparable dimensions and strength need be employed. In addition to reducing the overall material cost, a substantial reduction in weight without a corresponding reduction in structural rigidity is achieved. The new rib configuration and arrangement can be manufactured by the same manufacturing techniques employed to manufacture radial fin rotors, and the improved fin arrangement also achieves better cooling air flow through the rotor than is obtained with the standard radial fin arrangement.

SUMMARY OF THE INVENTION

In accordance with the present invention, the fins which interconnect the two annular braking members of a disc brake rotor are arranged in uniformly circumferentially spaced relationship along two circles of different radius centered on the rotor axis. The fins are elongated circumferentially of the rotor axis. The rotor may be formed as an integral casting utilizing the same tooling techniques as those employed in the casting of the standard radial finned rotor. Alternatively, the rotor hub may be formed as a sheet metal stamping with the two circular series of ribs projecting axially from the hub and from uniformally spaced spokes formed on the hub. This sheet metal stamping is utilized as an insert which is cast in place or otherwise assembled to the two annular braking members.

Other objects and features of the invention will become apparent by reference to the following specification and to the drawings.

Figure 1:
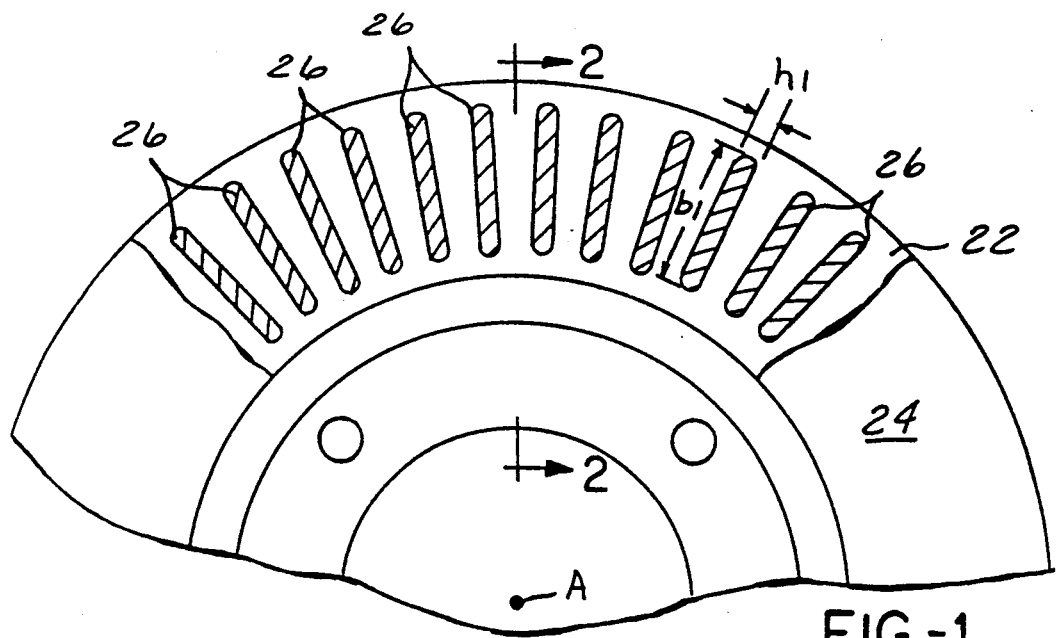
FIG. 1 is an end view of an automotive disc brake rotor of standard prior art construction, with certain parts broken away or shown in section.
Figure 2:
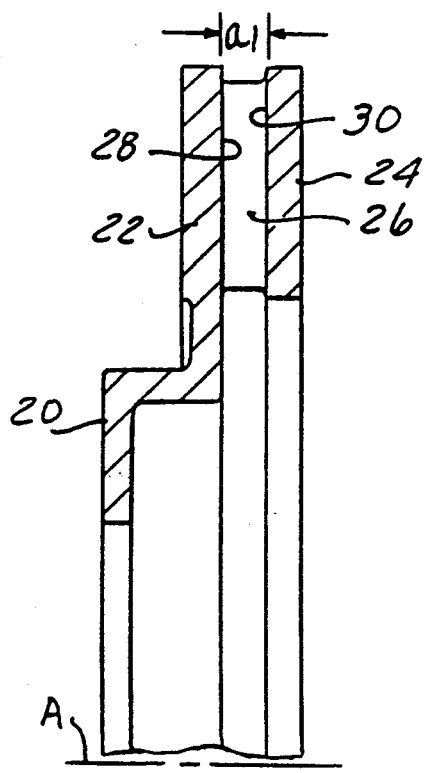
FIG. 2 is a cross sectional view of the prior art rotor of FIG. 1 taken on line 2—2 of FIG. 1.

A radially finned disc brake rotor of standard prior construction is shown in FIGS. 1 and 2 for purposes of comparison to rotors embodying the present invention and to identify certain fin dimensions utilized in comparing the prior art rotor to those of the present invention.

The prior art rotor of FIGS. 1 and 2 is typically constructed as a one piece casting formed with a central hub portion 20 integrally joined at its outer periphery to an annular plate like first braking member 22. A second annular plate like braking member 24 is integrally joined to the first braking member 22 by a plurality of fins 26 integrally joined to and extending between the opposed faces 28, 30 respectively of members 22 and 24 to support braking member 24 in axially spaced relationship to member 22 with the plate like annular braking members 22 and 24 lying in spaced parallel general planes in coaxial relationship to each other and to the axis A of rotation of the rotor.

The fins 26 lie in respective axial general planes extending radially from the rotor axis A and are uniformly angularly spaced about axis A. For purposes of comparing the fins of the standard prior art rotor of FIGS. 1 and 2 to fins conformed in accordance with the present invention, each fin 26 of the prior art rotor of FIGS. 1 and 2 may be considered to be a rectangular solid having a dimension $b_1$ measured radially of axis A, a tangential dimension $h_1$ measured tangentially of axis A and a dimension $a_1$ (FIG. 2) measured parallel to axis A.

Figure 3:
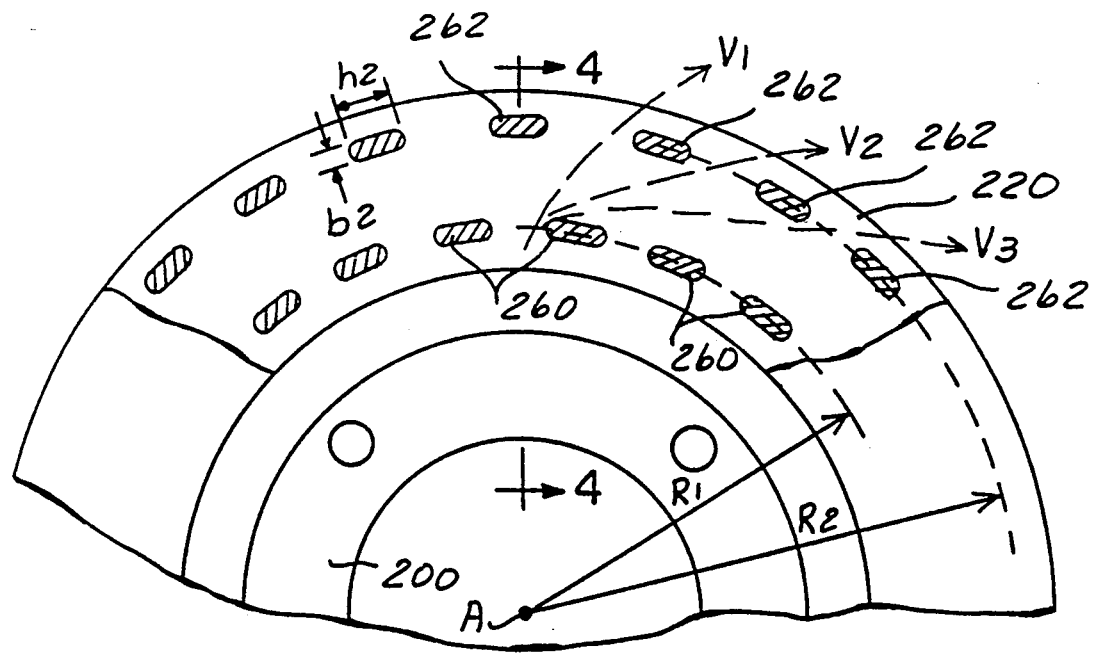
FIG. 3 is an end view of one form of rotor embodying the present invention, with certain parts broken away or shown in section.
Figure 4:
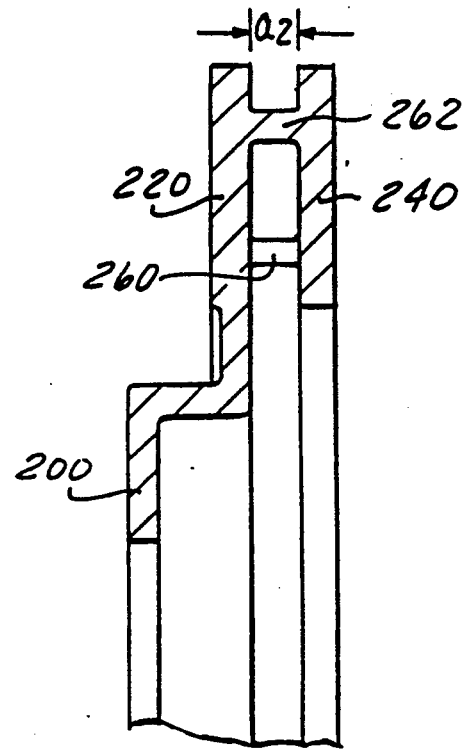
FIG. 4 is a detailed cross sectional view of the rotor of FIG. 3 taken on line 4—4 of FIG. 3.

Referring now to FIGS. 3 and 4, one form of disc brake rotor embodying the present invention may be formed as a one piece casting which includes a hub portion 200, a first annular braking member 220 integrally formed on the outer periphery of hub 200 and a second plate like annular braking member 240 integrally joined to member 220 by a plurality of fins 260, 262. The dimensions of the hub portion 200, first annular braking member 220 and second braking member 240 may be assumed to be identical to the corresponding dimensions of the hub portion 20, first braking member 22 and second braking member 24 of the standard prior art rotor shown in FIGS. 1 and 2.

It is believed apparent that the difference between the prior art rotor of FIGS. 1 and 2 and the rotor illustrated in FIGS. 3 and 4 resides in the size, shape and arrangement of the fins 260, 262 as compared to the size, shape and arrangement of the fins 26 of the prior art rotor of FIGS. 1 and 2. In the arrangement of FIGS. 3 and 4, the fins are divided into two groups, a first group of fins being the fins 260 which are uniformly spaced about the rotor axis A along a circle of radius $R_1$ centered at axis A and the remaining or second group of fins 262 which are similarly uniformly spaced along a second circle of radius $R_2$ also centered at the rotor axis A. For purposes of comparison with the prior art fin arrangement of FIGS. 1 and 2, the fins 260 and 262 may be considered as a substantially rectangular solid having a dimension $b_2$ radially of axis A, a dimension $h_2$ tangentially of axis A and a dimension $a_2$ (FIG. 4) parallel to axis A.

The primary function of the fins 26 of the prior art FIG. 1 rotor and the fins 260, 262 of the rotor of FIG. 3 is to transmit braking forces applied to the second braking member 24 or 240 to the first braking member 22 or 220 which is integrally attached to the hub 20 or 200 which in a turn will be fixedly attached to the wheel being braked. In order to transmit this braking force, the fins must be capable of resisting the stresses induced by the applied forces. In the case of the radially finned prior art rotor, the applied forces are schematically indicated in FIGS. 5a and 5b.

In the prior art radially finned rotor of FIGS. 1 and 2, a braking force F applied to the second braking member 24 acts in a direction tangentially of the rotor axis and may be considered to be applied to the rib 26 at the edges of the ribs 26 at which each rib is joined to the braking member 24. As indicated in FIG. 5a, the force $\Delta F$ as a portion of F is applied to the rib 26 at a distance $a_1$ from the location at which rib 26 is integrally joined to braking member 22, hence the applied force F will induce a bending stress in rib 26. The bending stress at this latter point is equal to the bending moment ($\Delta F a_1$) divided by the section modulus which, for a rectangular section is equal to $b_1 h_1^2 / 6$ which may be algebraically expressed as stress $S = 6 \Delta F a_1$.

Figure 6A:
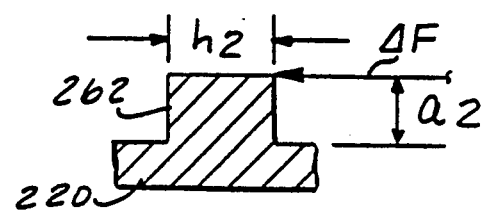
FIGS. 6a and 6b are respectively side and plan views of a fin embodying the present invention.
Figure 6B:
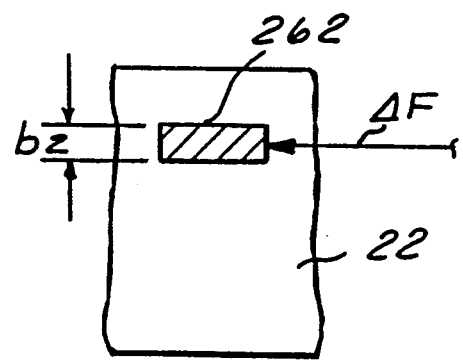

In FIGS. 6a and 6b, similar schematic diagrams representing the application of a braking force to braking member 240 of the FIG. 3 embodiment to a rib 262 are shown. In this case, the stress $S = 6 \Delta F a_2 / b_2 h_2^2$.

Figure 5A:
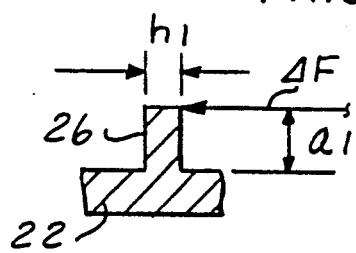
FIGS. 5a and 5b are respectively schematic side and plan views of a prior art fin of the type shown in FIGS. 1 and 2.
Figure 5B:
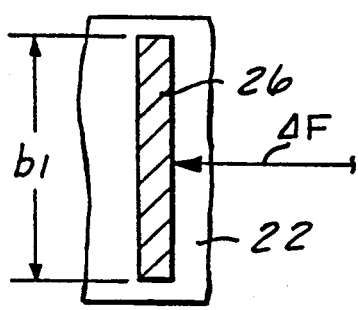

To compare the effectiveness of a single radial fin 26 of FIG. 1 to a single tangentially extending rib 262 of FIG. 3, the dimensions of a rib 262 can be compared to the dimensions of a radial rib 26 by analyzing the situation in which the same braking force $\Delta F$ applied as indicated in FIGS. 5a and 6a would induce the same bending stress in fin 26 as it would induce in fin 262. To simplify this comparison, it will be assumed that the axial dimensions $a_1$ and $a_2$ of the fins 26 and 262 are equal and that the smallest dimension of the respective fins 26 and 262—that is the fin thickness $h_1$ of the fin 26 is equal to the thickness $b_2$ of the fin 262. Thus, the relative size of the two fins can be compared by comparing their longest respective dimensions $b_1$ and $h_2$.

With the foregoing assumptions, if the two above equations for the bending stress of a fin 26 and the bending stress for a fin 262 are made equal to each other, the dimension $h_2$ of fin 262 is found to be equal to the square root of the cross sectional area $h_1 b_1$ of the fin 26.

To reduce this comparison to a numerical example, in a typical prior art radial fin rotor as shown in FIGS. 1 and 2, the dimension $a_1$ of a fin 26 may be taken as 10 mm, the dimension $h_1$ as 6 mm and the dimension $b_1$ as 45 mm, with the rotor as a whole having forty-eight fins 26. If a rib 262, as assumed above, has a dimension $a_2$ of 10 mm ($a_1 = a_2$), and a dimension $b_2$ of 6 mm ($h_1 = b_2$), then its dimension $h_2$ can be computed as 16.4 mm (the square root of $h_1 b_1$ which is the square root of $6 \times 45$ or the square root of 270). Effectively, in a disc brake rotor, a rib 262 or 260 oriented as shown in FIG. 3 and having dimensions of $6 \times 10 \times 16.4$ is as strong as a rib 26 oriented in FIG. 1 having dimensions of $6 \times 10 \times 45$ measured in the same units. A rotor constructed in the standard configuration of FIG. 1 having forty-eight ribs 26 of dimensions of 6 mm $\times$ 10 mm $\times$ 45 mm would require 939 grams of cast iron to form the forty-eight ribs 26. A rotor constructed as in FIGS. 3 and 4 having twenty-four ribs 262 and twenty-four ribs 260 all of dimensions of 6 mm $\times$ 10 mm $\times$ 16.4 mm would require only 342 grams of cast iron material to form all forty-eight ribs. This represents a weight saving of 597 grams per rotor for a rotor of equal strength.

In addition to the weight saving advantage set forth above, the rotor of FIG. 3 provides a more efficient flow of cooling air through the rotor as compared to the radial fin arrangement of the prior art rotor of FIG. 1. Because a substantially smaller volume of the space between the two braking members is occupied by the fins in the FIG. 3 arrangement, it is believed apparent that the FIG. 3 arrangement provides a substantially greater path of flow of air through the space between the two braking members than does the prior art radial fin arrangement of FIG. 1. Further, by staggering the locations of the fins 260 and 262 so that the fins 262 are radially aligned with the spaces between the fins 260, preferred flow paths of air through the fins for low, medium and high speeds of rotation of the rotor are indicated at v1, v2 and v3 respectively in FIG. 3. It will be noted that at higher speeds, the flow path length through the rotor increases, thus enabling more heat to be extracted from the braking members by the flowing air because the air sweeps a greater area of the braking members during its passage through the rotor.

One frequently proposed solution for improving the air flow through the prior art rotor of FIG. 1 is to incline or curve the fins to create an outwardly spirally flow paths. In addition to requiring more complex tooling, this solution requires the rotors to be made with left and right handed fin configuration to achieve similar air flow for rotation in either direction. The fin arrangement of FIG. 3 generates the same air flow in either direction of rotation.

In that embodiment of the invention disclosed in FIGS. 3 and 4, the fins 260 of the first group of fins and the fins 262 of the second group of fins are all assumed to be of equal dimension and further, each fin 260 and 262 has been assumed to be a structural equivalent of a single fin 26 of the prior art rotor of FIGS. 1 and 2. Further, in the FIGS. 3 and 4 embodiment, the number of fins 260 on the innermost circle is the same as the number of fins 262 on the outermost circle. While as a general rule for the present invention, the number of fins on the inner circle will be made equal the number of fins on the outer circle and the fins on the inner circle being symmetrically arranged at opposite sides of a radial line bisecting the space between two adjacent fins on the outer circle to achieve the desired bi-directional air flow paths, it is not necessary that the radial and tangential dimensions of the inner fins 260 be the same as the corresponding dimensions of the fins 262 on the outer circle.

Figure 7:
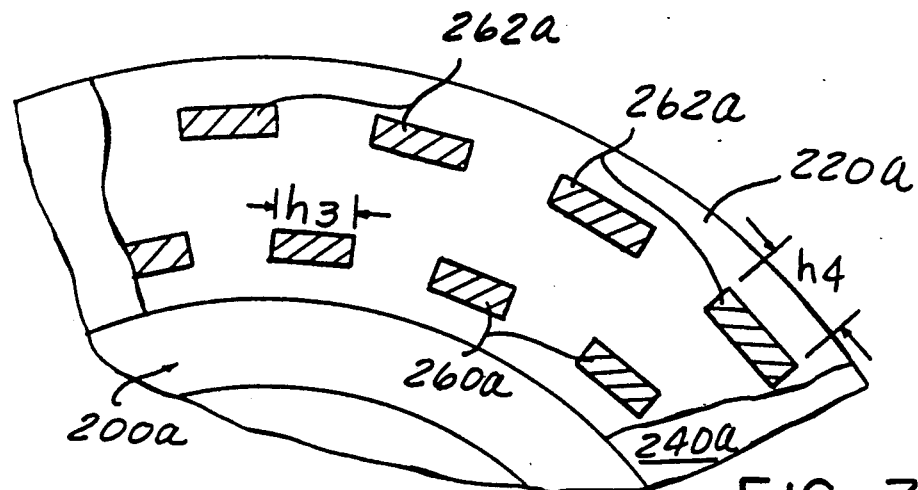
FIG. 7 is an end view of a portion of a disc brake rotor, with certain parts broken away or shown in section, of an alternative form of fin embodying the present invention.

In FIG. 7, one alternative arrangement is shown in which the tangential dimension $h_3$ of the fins 260a is less than the tangential dimension $h_4$ of the fins 262a located on the outer circle. Optimum dimensioning of the fins involves consideration of other dimensions of the rotor and the magnitude of the braking forces for which the rotor is designed. The general arrangement in which the fins are elongated tangentially of the rotor axis and arranged in two concentric circular groups allows a substantial degree of flexibility in selecting the tangential and radial dimensions of the fins to match the requirements of a specific rotor application.

Figure 8:
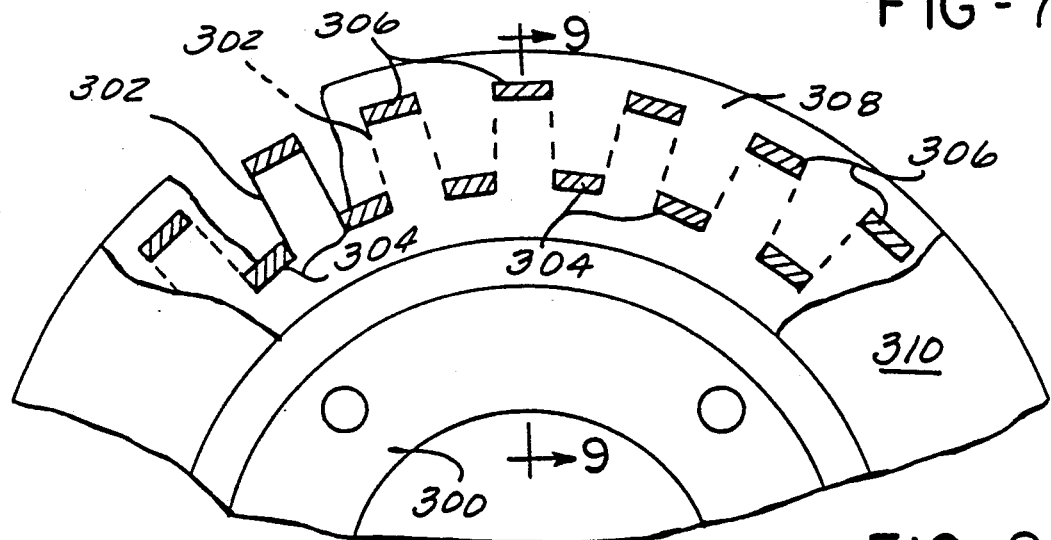
FIG. 8 is an end view of a portion of a disc brake rotor, with certain parts broken away or shown in section, of another form of brake rotor embodying the present invention.
Figure 9:
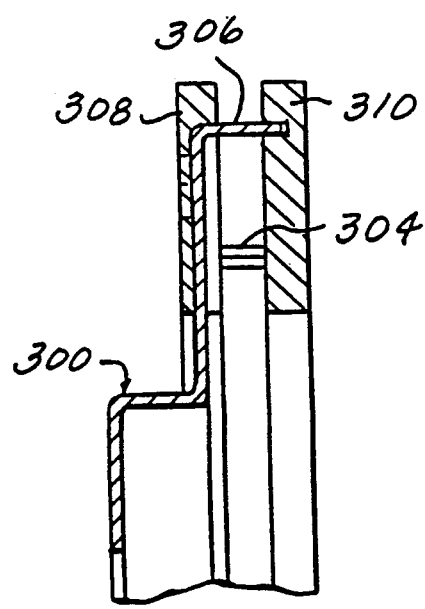
FIG. 9 is a cross sectional view of the rotor of FIG. 8 taken on line 9—9 of FIG. 8.

The rotors of FIGS. 3 and 4 and FIG. 7 are of a one piece cast construction. In FIGS. 8 and 9, the invention is shown applied to a rotor of modified construction in which a hub designated generally 300 is formed as a sheet metal stamping having a plurality of spoke like arms 302 projecting radially outwardly from the outer periphery of the central portion of the hub. The arms 302 are uniformly angularly spaced about the rotor axis. A first group of fins 304 project axially from the central portion of hub 300 between adjacent arms 302, while a second group of fins 306 project axially from the outer ends of the respective arms 302. The hub 300 may be cast in place with a pair of annular braking members 308, 310 or alternatively may be assembled with a pair of preformed braking members having appropriately located recesses to receive the arms and fins which are then welded in place. A steel sheet metal stamping such as the stamping 300 has a substantially higher strength to weight characteristic than a corresponding cast iron structure.

While various embodiments of the invention have been described in detail, it will be apparent to those skilled in the art that the disclosed embodiments may be modified, therefore, the foregoing description is to be considered exemplary rather than limiting, and the true scope of the invention is that defined in the following claims.

What is claimed is:

1. In a disc brake rotor including a pair of plate like annular braking members lying in spaced parallel general planes and a plurality of web like fins fixed to and extending between said members to fixedly support said members in axially spaced relationship to each other on a common axis normal to said general planes; the improvement wherein said plurality of fins comprises only a first group and a second group of fins, the first group of fins uniformly circumferentially spaced from each other along a first circle at a first radius from said common axis, the second group of fins uniformly circumferentially spaced from each other along a second circle at a second radius from said common axis greater than said first radius, each fin of said first and second groups of fins having a cross-section in a plane normal to said common axis of a substantially rectangular configuration elongated tangentially with respect to said common axis, each fin of said first group of fins symmetrically arranged on opposite sides of a radial line bisecting a space between two adjacent fins of said second group of fins.

2. The invention defined in claim 1 wherein the number of fins of said first group is equal to the number of fins of said second group and the fins of said second group are symmetrically angularly offset about said common axis from the fins of said first group.

3. The invention defined in claim 1 wherein a first dimension of each fin in said first and second groups of fins measured tangentially of said common axis exceeds a second dimension of each fin in said first and second groups of fins measured radially of said common axis.

4. The invention defined in claim 1 wherein said braking members and said fins are formed integrally with each other.

5. The invention defined in claim 1 further comprising a central hub member integrally formed with each fin of said first and second groups of fins projecting axially from one side of said hub member to a respective outer end of each fin of said first and second groups of fins, and means fixedly mounting one of said braking members on said hub member and mounting the other of said braking members upon the outer end of each fin of said first and second groups of fins.

6. In a disk brake rotor including a pair of plate-like annular braking members lying in spaced parallel general planes and a plurality of web-like fins fixed to and extending between said members to fixedly support said members in axially spaced relationship to each other on a common axis normal to said general planes;
the improvement wherein said plurality of fins comprises a first group of fins uniformly circumferentially spaced from each other along a first circle at a first radius from said common axis, a second group of fins uniformly spaced from each other along a second circle at a second radius from said common axis greater than said first axis, each fin in said first and second groups of fins having a cross-section in a plane normal to said common axis of a substantially rectangular configuration elongated tangentially with respect to said common axis, wherein said rotor further comprises a central hub member integrally formed with each fin of said first and second groups of fins projecting axially from one side of said hub member to a respective outer end of each fin of said first and second groups of fins, and means fixedly mounting one of said braking members on said hub member and mounting the other of said braking members upon the outer end of each fin of said first and second groups of fins, and wherein said hub member comprises an annular outer peripheral portion lying in a general plane perpendicular to said common axis, a plurality of spoke-like arms integral with said peripheral portion and projecting radially outwardly from said peripheral portion at uniformly spaced locations about said common axis, said first group of fins projecting axially from said peripheral portion at locations between said spoke-like arms and lying in respective general planes tangential to said first circle, and said second group of fins projecting axially from the respective radially outer ends of said arms and lying in respective general planes tangential to said second circle.

7. A disc brake rotor comprising:

a pair of plate-like annular braking members lying in spaced parallel general planes;

a plurality of web-like fins fixed to and extending between said pair of braking members to fixedly support said braking members in axially spaced relationship to each other on a common axis normal to said general planes, said plurality of fins divided into only a first group and a second group of fins, the first group of fins uniformly circumferentially spaced from each other along a first circle at a first radius from said common axis, the second group of fins uniformly circumferentially spaced from each other along a second circle at a second radius from said common axis greater than said first radius, each of said fins in said first group and said second group of fins having a substantially rectangular cross-sectional configuration in a plane normal to said common axis such that said substantially rectangular cross-sectional configuration is disposed with a longest side tangential with respect to said common axis, each fin of said first group of fins radially aligned with spaces between two adjacent fins of said second group of fins, and each fin of said second group of fins radially aligned with spaces between two adjacent fins of said first group of fins.

8. The disc brake rotor of claim 7 further comprising said first group of fins having an equal number of fins with respect to said second group of fins.

9. The disc brake rotor of claim 8 further comprising the second group of fins symmetrically angularly offset about said common axis from said first group of fins.

10. The disc brake rotor of claim 9 further comprising each fin in said first group and said second group of fins having an overall tangential dimension exceeding an overall radial dimension.

11. The disk brake rotor of claim 10 wherein said braking members and said fins are formed integrally with each other.

12. The brake disk rotor of claim 10 further comprising a central hub member integrally formed with each fin of said first and second groups of fins projecting axially from one side of said hub member to a respective outer end of each fin of said first and second groups of fins, and means for fixedly mounting one of said braking members on said hub member and for mounting the other said braking members upon the outer end of each fin of said first and second groups of fins.

13. A disc brake rotor comprising:

a pair of plate-like annular braking members lying in spaced parallel general planes;

a plurality of web-like fins fixed to and extending between said pair of braking members to fixedly support said braking members in axially spaced relationship to each other on a common axis normal to said general planes, said plurality of fins divided into only a first group and a second group of fins, the first group of fins circumferentially spaced from each other along a first circle at a first radius from said common axis, the second group of fins uniformly spaced from each other along a second circle at a second radius from said common axis greater than said first radius, each of said fins in said first group and said second group of fins having a substantially rectangular cross-sectional configuration in a plane normal to said common axis such that said substantially rectangular cross-sectional configuration is disposed with a longest side tangential with respect to said common axis, said first group of fins having an equal number of fins with respect to said second group of fins, said second group of fins symmetrically angularly offset about said common axis from said first group of fins, each fin in said first and second groups of fins having an overall tangential dimension exceeding an overall radial dimension; and a central hub member integrally formed with each fin of said first and second groups of fins projecting axially from one side of said hub member to a respective outer end of each fin of said first and second groups of fins, and means for fixedly mounting one of said braking members on said hub member and for mounting the other said braking members upon the outer end of each fin of said first and second groups of fins, wherein said central hub member is formed as a sheet metal stamped central hub member having a plurality of spoke-like arms projecting radially outwardly from an outer periphery of a central portion of said central hub member, said arms uniformly angularly spaced about said common axis.

14. The disk brake rotor of claim 13 wherein said means for fixedly mounting comprises said braking members cast in place on said sheet metal stamped central hub member.

15. The disk brake rotor of claim 13 wherein said means for fixedly mounting comprises said braking members welded to said sheet metal stamped central hub member.

16. The disk brake rotor of claim 13 wherein said sheet metal stamped central hub member is constructed of steel.

* * * * *